United States Patent [19]
Gardner

[11] 3,910,154
[45] Oct. 7, 1975

[54] SEPARATION NUT
[75] Inventor: Ronald E. Gardner, Lomita, Calif.
[73] Assignee: Hi-Shear Corporation, Torrance, Calif.
[22] Filed: May 2, 1973
[21] Appl. No.: 356,287

[52] U.S. Cl. ............................... 85/33; 89/1 B
[51] Int. Cl. ............................ F16b 37/00
[58] Field of Search ............ 85/33, DIG. 1; 89/1 B; 285/35; 24/211 M, 211 R, 251, 132 LS, 230 AT

[56] References Cited
UNITED STATES PATENTS

| | | | |
|---|---|---|---|
| 3,147,663 | 9/1964 | Brown | 85/33 |
| 3,204,515 | 9/1965 | Dickie et al. | 85/33 |
| 3,262,351 | 7/1966 | Webb | 85/33 |
| 3,520,223 | 7/1970 | Lilly | 85/33 X |
| 3,757,836 | 9/1973 | Masuda | 285/35 X |

FOREIGN PATENTS OR APPLICATIONS
779,032   2/1968   Canada ................. 85/33

*Primary Examiner*—Ramon S. Britts
*Attorney, Agent, or Firm*—Donald D. Mon

[57] ABSTRACT

A separation nut for releasably engaging a threaded element. A housing forms an internal cavity which houses a segmented nut. The nut segments are held in an assembled element-engaging condition by a lock plunger. The lock plunger releases the nut segments when sufficient fluid pressure is exerted to move it. Means is provided for causing arcuate motion of the nut segments, whereby reliably and positively to remove them from the threaded element.

18 Claims, 4 Drawing Figures

SEPARATION NUT

This invention relates to a separation nut for releasably engaging a threaded element.

Separation nuts for engaging threaded elements are known. In general, they comprise a group of individual nut segments, each bearing a fragment of a thread. The segments are held in a grouped condition by a surrounding member such as a lock plunger. Means is customarily provided to move the lock plunger to release the nut segments. Such means is commonly a fluid under pressure such as hydraulic pressure from some source, or gases under pressure derived from the ignition of a squib. Some examples of known separation nuts are the following U.S. patents issued to W. R. Dickie:

| No. | Issue Date | Title |
| --- | --- | --- |
| 3,120,149 | February 4, 1964 | Explosive Separable Segmented Nut Including Key and Spline Means |
| 3,170,363 | February 23, 1965 | Explosive Separable Nut |
| 3,176,573 | April 6, 1965 | Explosive Separable Nut |

Each of the above separation nuts has the same intended objective, namely, to engage a threaded element and hold an assembly together, and then, when a sufficient actuating force is exerted, to release the threaded element. Numerous problems are confronted by such devices, such as the shock forces transmitted to the surrounding structure as a consequence of the release action, and the possibility that the nut might not fully disengage. Each of the foregoing separation nuts has attempted to solve in its own way some or all of the problems in the art. The instant invention comprises yet another advancement in this art.

It is an object of this invention to provide reliable release of the threaded element as a consequence of the arcuate rotation of the nut segments wherein their thread fragments swing away from the threaded element under positive position control at all times. Under such circumstances, positive disengagement can be assured.

A separation nut according to this invention has an engagement axis, and includes a housing that forms an internal cavity. An aperture enters the cavity to receive the element to be engaged. A seat member on the housing faces into the cavity. A plurality of nut segments in the housing is grouped around the engagement axis to form a segmented nut. Anti-rotation means fixed relative to the housing holds the segmented nut against rotation therein. Each nut segment includes a concave surface that faces the engagement axis. A thread fragment is formed on the concave surface, which fragment is part of the same thread as is formed on the other segments. A lock surface, a relief surface, a cam surface, and a brace surface all face away from the engagement axis. An abutment surface faces the seat member, and a fulcrum surface is axially spaced from the abutment surface. A lock plunger is axially movable in the cavity and has a bounding wall which bounds an opening that receives the nut segments in their grouped configuration. A lock surface, a drive cylinder, a drive face, a cam surface, and a brace surface all are formed on the bounding wall. The lock surface is disposed so as to embrace the lock surfaces of the nut segments in the engaged condition of the separation nut, at which condition the brace surfaces abut each other, and the abutment surface bears against the seat member.

A drive piston makes an axially sliding fit in the drive cylinder, and has a drive face that faces toward the drive face of the lock plunger. This forms a power chamber in the drive cylinder to receive fluid under pressure for causing separation. A fulcrum surface is so disposed and arranged on the drive piston as to bear against the fulcrum faces of the nut segments. Conduit means is provided to convey fluid under pressure to the power chamber, whereby to move the lock plunger axially to an unengaged position wherein its lock surface does not embrace the lock surfaces of the nut segments, wherein the cam surfaces engage one another to rotate the nut segments around the fulcrum surfaces, and wherein the thread fragments move arcuately away from the engagement axis to release the threaded element which was engaged to the previouslygrouped nut segments.

According to a preferred but optional feature of this invention, the fulcrum surfaces on the nut segments are concave and face the fulcrum surface on the drive piston.

According to still another preferred but optional feature of the invention, the conduit means includes a tubular neck extending from the drive piston which makes a sliding fit in a conduit in the housing.

According to another preferred but optional feature of the invention, the housing includes a head member which is rotatable around the engagement axis. A port in said head is disposed laterally of the engagement axis. Rotating the head member changes the location of the port so that its position relative to external connections can be adjusted.

The above and other features of this invention will be fully understood from the following detailed description and the accompanying drawings in which.

Figure 1:
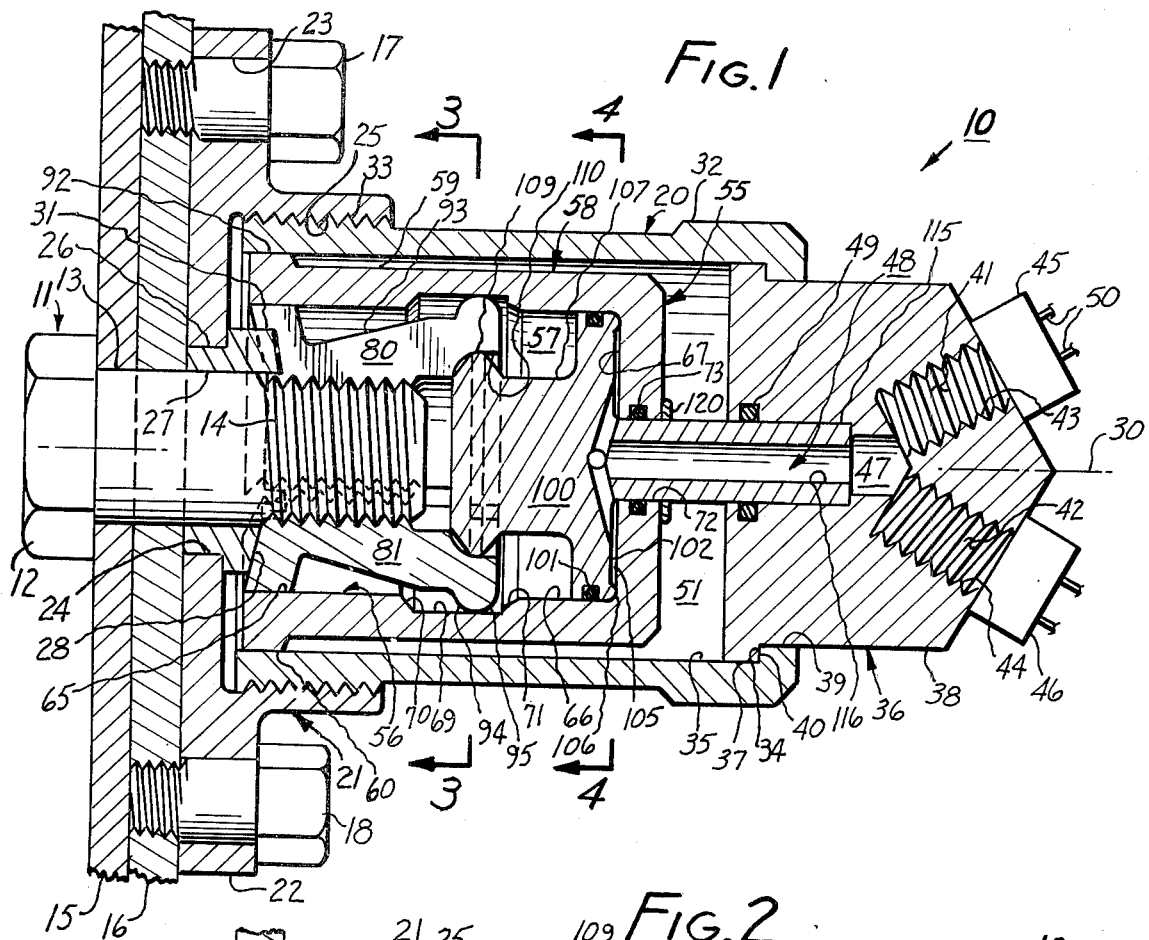
FIG. 1 is an axial cross-section of the presently preferred embodiment of the invention in its engaged condition.
Figure 3:
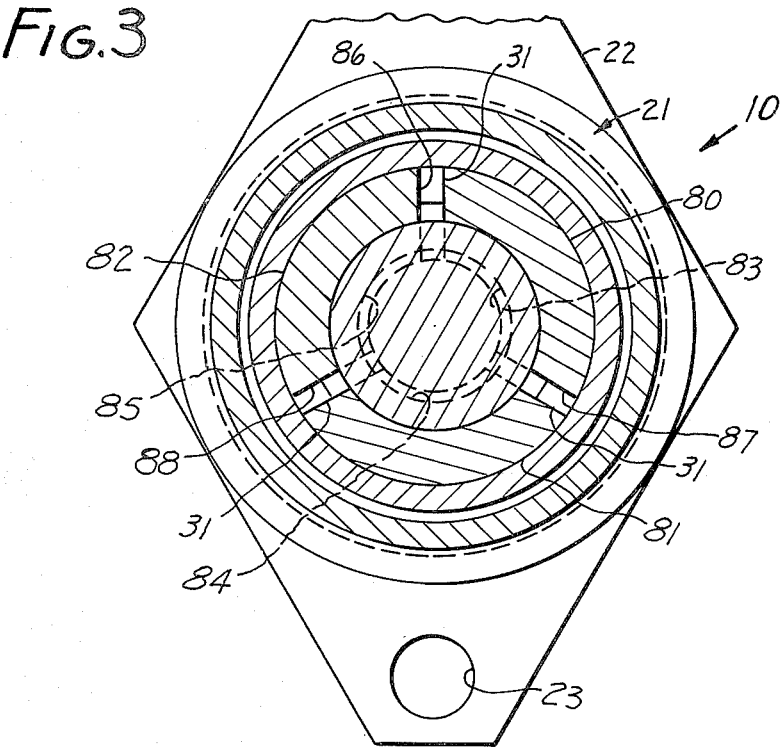
Figure 4:
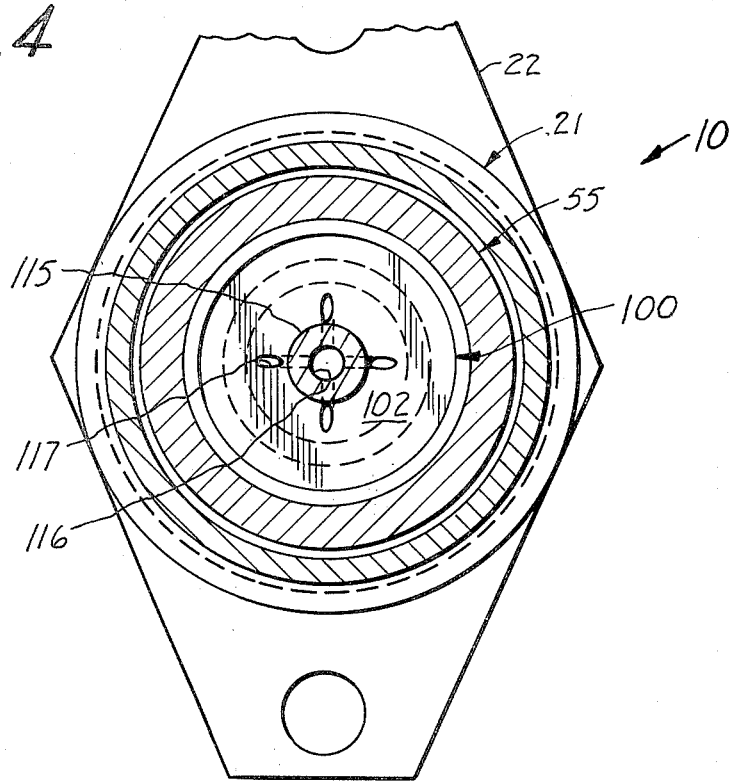

FIGS. 3 and 4 are cross-sections taken at lines 3–3 and 4–4 in FIG. 1.

The presently preferred embodiment of the invention, which is also the best known mode of practicing this invention, is shown in FIG. 1. A separation nut 10 is shown engaged to a threaded element 11, in this case a bolt having a head 12, a shank 13, and a thread 14. The thread 14 is shown as a helical thread. It will be understood throughout this invention that the terms "thread" or "fragment of thread" are not limited to helical threads, but also comprehend and include grooves and other structures wherein overlapping interengaging surfaces hold an element against axial separation. The term "threaded element" means any element having a structure adapted releasably to be engaged by the "thread" on the nut segments.

The threaded element is shown engaged by a separation nut to hold a first plate 15 assembled to a second plate 16. In turn, the separation nut is attached to second plate 16 by screws 17, 18 or other attachment means so that plate 16 acts as a nut plate. The separation nut can be used as a loose nut, unattached to a plate, if preferred. The drawings show an elementary example of the application of the separation nut, it being understood that it is possible to attach various types of structures and devices to one another, so long as the attachment is accomplished by the releasable joinder at the thread.

The separation nut includes a housing 20. The housing is made in four basic parts, one of which is a base member 21 having a flange 22 for attachment of the separation nut to other objects such as plate 16. Holes 23 are provided to pass attachment means such as screws 17 and 18. The base member has an aperture 24 and an internal thread 25. A seat member 26, which forms another part of the housing, is pressed into aperture 24 and includes its own aperture 27, which may be regarded as an extension of aperture 24. If desired, the seat member may be made of harder material than that of the base member because of the wear it takes. For example, all parts of the housing except the seat member may be made of aluminum, and the seat member may be made of steel. The seat member has a face 28 which faces into the cavity and tapers inwardly toward an engagement axis 30 as it extends into the cavity.

Anti-rotation means 31 in the form of keys integral with the seat member are fixed relative to the housing by being formed integrally with the seat member. The keys project from face 28. In this embodiment, there are three such anti-rotation means. They also serve to space the nut segments apart, as will become apparent. The seat member is held against rotation relative to the remainder of the base member by being press-fitted or otherwise firmly attached thereto.

A body member 32 forms another part of the housing. It is tubular and has an external thread 33 threaded to internal thread 25 on the base member. It also includes an internal shoulder 34. The inner wall 35 of the body member is cylindrical.

A rotatable head member 36 forms the fourth part of the housing. It has an external cylindrical wall 37 slightly smaller than inner wall 35 of body member 32, and a projecting neck 38 which extends through the opening 39 formed by internal shoulder 34. Shoulder 40 on the head member engages internal shoulder 34. These shoulders are preferably mirror images so as to make a close surface-to-surface contact with one another, and are surfaces of revolution so the head member can be rotated in the body member. The head member also includes a pair of ports 41, 42 which have internal threads 43, 44 to receive squibs 45, 46, which are examples of sources of fluid under pressure for actuating the separation nut. Squibs for this purpose are well known, one such squib being shown in U.S. Pat. No. 3,135,200, issued to Jackson, on June 2, 1964. It is a function of such squibs, that upon ignition usually by an electric current, they provide a substantial volume of gas at elevated pressure. Alternatively to squibs, the source for actuation could be a hydraulic or pneumatic pump, or storage tank supplying a suitable gas or liquid under pressure sufficient to actuate the device.

A conduit 47 intersects ports 41 and 42. These ports and conduit 47 form a portion of conduit means 48, another portion of which remains to be described. An O-ring 49 is provided as a sliding seal for a purpose yet to be described.

The rotatability of head member 36 is useful when installthis separation nut. It is evident that the position of the housing itself is determined by the attachment means, and it is desirable to have leads such as leads 50 to the squibs, or pressure lines, as short as possible. The ability to rotate the head so that the position of the ports around the engagement axis can be changed provides the user with the capability of locating the ports in the most convenient location.

The housing is therefore comprised of the base member, the seat member (when made as a separate part as shown), the body member, and the head member. Together, when assembled as shown, they form a cavity 51. Aperture 27 enters the cavity to receive element 11 which is to be engaged by the separation nut.

For the purposes of engaging and releasing the threaded element, parts are provided inside the cavity. One such part is a lock plunger 55. The lock plunger has an internal bounding wall 56 which bounds an opening 57. It also has an outer wall 58 with a relieved portion 59. The relieved portion reduces the area of the lock cylinder which might drag along the inner wall 35 when the lock plunger moves axially. A shoulder 60, whose diameter is slightly less than that of inner wall 35, is adjacent to the relieved portion. It is unnecessary for a sliding, fluid-sealing fit to be made between the inner wall 35 of the body member and outer wall 58 of the lock plunger.

The bounding wall includes a lock surface 65, a drive cylinder 66, which is a right circular cylinder centered on the engagement axis, a drive face 67 which extends transversely to the engagement axis, a groove 68 which is bounded by a brace surface 69 (the bottom of the groove, and preferably cylindrical), and a pair of shoulders, one of which is a cam surface 70 and the other of which is a ramp surface 71 which prevents cutting of an O-ring 101 during assembly of the separation nut.

A passage 72 is formed at the center of the drive face and includes an O-ring 73 to form a fluid seal for a purpose which will become evident.

Three nut segments 80, 81, 82 are grouped together in FIG. 1 in their element-engaging condition. These nut segments bear respective thread fragments 83, 84, 85, each of which fragments is part of the same thread as is formed on the other segments. They are, of course, angularly out of phase from one another, i.e., they are not identical fragments. The nut segments are best formed by manufacturing them as part of a single tubular construction with a continuous thread tapped inside. Then the structure is sawed apart, forming gaps 86, 87, 88 which when assembled are filled at their ends by the anti-rotation means. Accordingly, when the nut segments are assembled as shown, they must be in the order in which they existed in the original structure. With the exception that the thread fragments are out of phase, the nut segments are identical, and accordingly, like elements will be similarly numbered throughout.

Each nut segment includes a concave surface 89 which faces toward the engagement axis. The thread fragment is formed in this concave surface. Each nut segment also includes an abutment surface 90 (sometimes called a "first abutment surface") which is intended to bear against seat member 26 and to have approximately the same taper angle, i.e., about 160° conical included angle.

A fulcrum surface 91 is formed at the opposite end of the segment and is preferably a concave surface of revolution, having a substantial curvature for purposes yet to be described.

On the outside of the nut segments, facing away from the engagement axis, the nut segments include a lock surface 92, a relief surface 93 (so-called because it is recessed, or relieved, into the segment relative to the lock segment), a cam surface 94, and a brace surface 95. Surfaces 94 and 95 are preferably formed as regions of a curved shoulder as shown.

A drive piston 100 is fitted in the drive cylinder 66. It includes an O-ring 101 to form a sliding, fluid sealing fit therein. The drive piston has a drive face 102 facing toward drive face 67. There is, therefore, formed within the bounding wall a power chamber 105 bounded by drive faces 67 and 102 and the drive cylinder. A spacer shoulder 106 is formed on the drive face 102 to hold the two drive faces apart.

An extension 107 of the drive piston terminates in an enlargement 108 which bears a fulcrum surface 109 that in turn bears against fulcrum surfaces 91 of the nut segments. As best shown in FIG. 1, fulcrum surface 109 may conveniently be cylindrical, and there may be a cylindrical portion 110 on fulcrum surface 91 such that a surface-to-surface contact is made between the two fulcrum surfaces when the brace surfaces are also in abutment as shown in FIG. 1. This provides a positive abutment between all of the parts. The remaining portion of the fulcrum surface on the nut segments is curved to accommodate the rotary motion which occurs in moving to the condition shown in FIG. 2.

A tube 115 is formed integrally with, or is attached to, drive piston 100. It extends through passage 72 in the lock plunger and makes a fluid-sealing sliding fit with O-ring 73 and also extends into conduit 47 making a sliding fluid seal with O-ring 49. The tube includes a conduit 116 which has branches 117 that open onto drive face 102 and, therefore, into power chamber 105. Therefore, conduits 47 and 116 (with branches 117 and ports 41 and 42) form conduit means 48 for conveying fluid under pressure to the power chamber.

Restraint means 120 restrains relative motion between the lock plunger and the drive piston. This means may have various forms, but must be yieldable or releasable in order that relative motion can occur between the lock plunger and drive piston. A suitable device is a springy snap-ring which tightly embraces tube 115 and bears against the lock piston. Because the drive piston cannot move farther to the right, relative to the lock plunger, than in FIG. 1, the purpose of the restraint means is to prevent it from moving too readily to the left, and this is accomplished by frictional drag. Therefore, the restraint means is intended to restrain only in that one direction.

The use of this separation nut should be evident from the foregoing. The separation nut is assembled as shown in FIG. 1, and the threaded element, such as bolt 11, is simply threaded in (or pressed in if a groove is used) to tighten down the entire assembly. The nut segments as a group cannot rotate because of the antirotation means which engage in the gaps 86, 87 and 88. The assembly now remains completely tight and integral until a fluid under sufficient pressure is injected into the power chamber, such as by ignition of the squibs or by any other desired means. Under these circumstances, pressure will move the lock plunger to the right in FIG. 2 and tend to move the drive piston to the left. This causes the lock surface of the lock plunger, which previously embraced the lock surfaces of the nut segments, instead to overlay the relief surfaces. Then, pressure of the drive piston against the fulcrum surface will exert an axial component of force tending to press the first abutment surfaces 90 against the seat member and exert an outwardly-camming action. At the same time, the cam surfaces will have engaged one another to exert a torque, tending to cause rotation of the nut segments.

Rotation will not have occurred, of course, until there will have been sufficient movement of the lock plunger that the lock surfaces have moved clear of each other. Accordingly, the segments will be free to rotate by the time the cam surfaces contact one another, which contact will occur after the lock surfaces no longer overlap. Further movement of the lock plunger to the right in FIG. 1 will cam the cam surface on the nut segments inwardly toward the axis, and will cause rotation of the nut segments around the fulcrum surfaces toward and to the position shown in FIG. 2. It will be seen that there is no condition during this motion in which the position of the nut segment is not uniquely related to the relative axial positions of the lock plunger, the drive piston, and the housing. Therefore, movement of the nut segments is under positive control.

Figure 2:
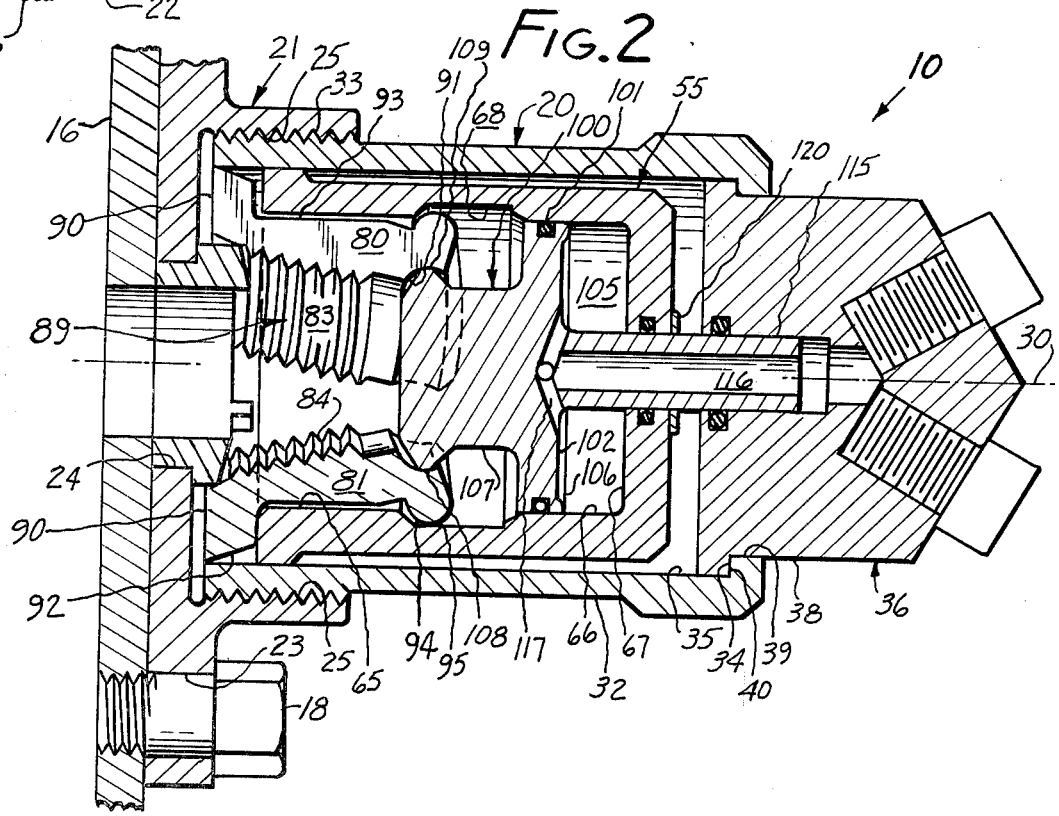
FIG. 2 is a similar view of the device in its disengaged condition.

In FIG. 2, it will be noted that, in the final position, the cam surfaces might no longer be in contact with one another, but the position of the nut segments is determined by the drive piston, the seat member and the inside wall of the lock plunger. The thread fragments will have been arcuately moved away from the threaded element and cannot interfere with its removal.

With further reference to FIG. 1, it will be noted that the nut segments are trapped between the brace surfaces, fulcrum surfaces and seat member. This is a closely coupled and reliable separation nut which provides arcuate motion of nut segments under closer control of position than has been attained in prior art constructions.

This invention is not to be limited by the embodiment shown in the drawings and described in the description, which is given by way of example and not of limitation, but only in accordance with the scope of the appended claims.

I claim:

1. A separation nut for releasably engaging a threaded element, said separation nut having an engagement axis and comprising: a housing forming an internal cavity and an aperture entering the cavity to receive the element to be engaged by the separation nut; a seat member on the housing facing into the cavity and tapering inwardly as it extends into the cavity; antirotation means fixed relative to the housing; a plurality of individually disconnected nut segments in grouped configuration around the engagement axis to form a segmented nut, each nut segment including a concave surface facing the engagement axis, a thread fragment on the concave surface, which fragment is part of the same thread as is formed on the other segments, a lock surface, a relief surface, a cam surface, and a brace surface, all facing away from the engagement axis; an abutment surface facing the seat member, and a fulcrum surface axially spaced from the abutment surface, the nut segments engaging the anti-rotation means, whereby to be held against rotation around the engagement axis; a lock plunger axially movable in said cavity, a bounding wall in said lock plunger which bounds an opening that receives the nut segments in their grouped configuration, a lock surface, a drive cylinder, a drive face, a cam surface, and a brace surface, all on said bounding wall, the lock surface being so disposed and arranged as to embrace the lock surfaces of the nut segments in an engagement condition of the separation nut, at which condition the brace surfaces abut each other and the abutment surface bears against the seat member; a drive piston making an axially sliding fit in said drive cylinder and having a drive face facing toward the drive face of the lock plunger, whereby to form a power chamber in the drive cylinder, and a fulcrum surface so disposed and arranged as to bear against the fulcrum faces of the nut segments and disposed radially inwardly of the cam surfaces; and conduit means to convey fluid under pressure to said power chamber whereby to move the lock plunger axially to an unengaged position wherein its lock surface does not embrace the lock surfaces of the nut segments and does overlay the relief surfaces, wherein the cam faces engage one another to rotate the nut segments around the fulcrum surfaces as a consequence of a torque couple exerted at the cam surfaces and on the fulcrum surfaces, and the thread fragments move arcuately away from the engagement axis to release the element which was engaged by the previously-grouped nut segments, while the nut segments are retained in the housing by the drive piston.

2. A separation nut according to claim 1 in which the fulcrum surfaces on the nut segments are concave facing the fulcrum surface on the drive piston.

3. A separation nut according to claim 1 in which the fulcrum surfaces on the nut segments are fragments of concave surfaces of revolution generated around the engagement axis.

4. A separation nut according to claim 1 in which a tubular neck extends from the drive piston, and makes a sliding fit in a conduit in the housing, the tubular neck and conduit in the housing forming said conduit means.

5. A separation nut according to claim 1 in which the housing includes a head member which is rotatable around the engagement axis, and in which a port communicating with said conduit means is disposed laterally of the engagement axis, whereby rotation of the head member changes the location of the said port.

6. A separation nut according to claim 5 in which a tubular neck extends from the drive piston, and makes a sliding fit in a conduit in the housing, the tubular neck and conduit in the housing forming said conduit means.

7. A separation nut according to claim 1 in which the housing includes a base member, a body member and a head member, the seat member being mounted to the base member.

8. A separation nut according to claim 7 in which the head member is rotatable around the engagement axis, and in which a port communicating with said conduit means is disposed laterally of the engagement axis, whereby rotation of the head member changes the location of the said port relative to the base member.

9. A separation nut according to claim 1 in which the brace surface on the lock piston is the base of a peripheral internal groove in said boundary wall, and in which the cam surface of the lock piston is one wall of said groove.

10. A separation nut according to claim 9 in which a tubular neck extends from the drive piston, and makes a sliding fit in a conduit in the housing, the tubular neck and conduit in the housing forming said conduit means.

11. A separation nut according to claim 10 in which the tubular neck extends through and makes a sliding fluid-sealing fit in the drive face of the lock plunger, and in which restraint means releasably retains the neck at a predetermined axial position relative to the lock plunger.

12. A separation nut according to claim 11 in which, when the separation nut is in its article-engaging condition, the fulcrum surfaces engage one another, the brace surfaces engage one another, and the lock surfaces engage one another.

13. A separation nut according to claim 11 in which the fulcrum surfaces on the nut segments are concave facing the fulcrum surface on the drive piston.

14. A separation nut according to claim 11 in which the fulcrum surfaces on the nut segments are fragments of concave surfaces of revolution generated around the engagement axis.

15. A separation nut according to claim 11 in which the housing includes a flange for attachment to another body.

16. A separation nut according to claim 1 in which the housing includes a flange for attachment to another body.

17. A separation nut according to claim 1 in which the thread is a peripheral groove lying in a plane normal to the engagement axis.

18. A separation nut according to claim 1 in which the thread is a helical thread.

* * * * *